(12) United States Patent
An et al.

(10) Patent No.: US 10,493,535 B2
(45) Date of Patent: Dec. 3, 2019

(54) CUTTING INSERT

(71) Applicant: KORLOY INC, Seoul (KR)

(72) Inventors: Dong Sub An, Chungcheongbuk-do (KR); Sung Hun Kim, Chungcheongbuk-do (KR); Hyo San Kim, Chungcheongbuk-do (KR); Sang Ho Lim, Chungcheongbuk-do (KR); Young Heum Kim, Chungcheongbuk-do (KR)

(73) Assignee: KORLOY INC, Seoul (KR)

( * ) Notice: Subject to any disclaimer, the term of this patent is extended or adjusted under 35 U.S.C. 154(b) by 0 days.

(21) Appl. No.: 15/748,790

(22) PCT Filed: Sep. 22, 2016

(86) PCT No.: PCT/KR2016/010553
§ 371 (c)(1),
(2) Date: Jan. 30, 2018

(87) PCT Pub. No.: WO2017/052208
PCT Pub. Date: Mar. 30, 2017

(65) Prior Publication Data
US 2019/0009345 A1    Jan. 10, 2019

(30) Foreign Application Priority Data
Sep. 24, 2015 (KR) .......................... 10-2015-0135684

(51) Int. Cl.
*B23B 27/22* (2006.01)
*B23B 27/16* (2006.01)
(Continued)

(52) U.S. Cl.
CPC ............ *B23B 27/143* (2013.01); *B23B 27/22* (2013.01); *B23B 2200/0447* (2013.01); *B23B 2200/081* (2013.01); *B23B 2200/321* (2013.01)

(58) Field of Classification Search
CPC ...... B23B 2200/085; B23B 2200/0447; B23B 2200/081; B23B 2200/321; B23B 27/143; B23B 27/22
See application file for complete search history.

(56) References Cited

U.S. PATENT DOCUMENTS 3,187,406 A * 6/1965 Franko ................ B23B 27/1618
407/114
3,395,434 A * 8/1968 Wirfelt .................. B23B 27/143
407/114

(Continued)

FOREIGN PATENT DOCUMENTS

CN    101695761 A    4/2010
JP    2007-301669 A   11/2007

(Continued)

OTHER PUBLICATIONS

International Search Report dated Jan. 11, 2017 issued in PCT/KR2016/010553.

(Continued)

*Primary Examiner* — Sara Addisu
(74) *Attorney, Agent, or Firm* — Scully, Scott, Murphy & Presser, P.C.

(57) ABSTRACT

The present disclosure relates to a cutting insert. The cutting insert according to the exemplary embodiment of the present disclosure has a dot formed between a main cutting edge and a chip breaker, and the dot has a bridge formed between the main cutting edges. Therefore, a chip, which is produced during a cutting process, may come into contact with three points on a main cutting edge land portion, the bridge, and the dot. The chip may discharge heat generated from the cutting insert while the chip comes into contact with the three points.

16 Claims, 13 Drawing Sheets

(51) Int. Cl.
*B23P 15/30* (2006.01)
*B23B 27/14* (2006.01)

(56) References Cited

U.S. PATENT DOCUMENTS

| | | | | |
|---|---|---|---|---|
| 5,044,840 A | * | 9/1991 | Fouquer | B23B 27/143 407/113 |
| 5,074,720 A | * | 12/1991 | Loqvist | B23C 5/202 407/114 |
| 5,282,703 A | * | 2/1994 | Itaba | B23B 27/143 407/114 |
| 5,476,346 A | * | 12/1995 | Lundstrom | B23B 27/143 407/114 |
| 5,743,681 A | * | 4/1998 | Wiman | B23B 27/143 407/114 |
| 5,758,994 A | * | 6/1998 | Hintze | B23B 27/141 407/113 |
| 5,897,272 A | * | 4/1999 | Wiman | B23B 27/143 407/114 |
| 7,182,555 B2 | * | 2/2007 | Kitagawa | B23B 27/141 407/113 |
| 7,621,700 B2 | * | 11/2009 | Jonsson | B23B 27/10 407/114 |
| 8,267,623 B2 | * | 9/2012 | Park | B23B 27/143 407/113 |
| 8,876,441 B2 | * | 11/2014 | Majima | B23B 27/143 407/113 |
| 2003/0059265 A1 | * | 3/2003 | Brockett | B23B 27/141 407/114 |
| 2008/0219784 A1 | * | 9/2008 | Yamazaki | B23B 27/143 407/114 |
| 2009/0226269 A1 | * | 9/2009 | Iyori | B23B 27/143 407/114 |
| 2011/0142555 A1 | * | 6/2011 | Yamazaki | B23B 27/143 407/2 |
| 2015/0075338 A1 | * | 3/2015 | Onodera | B23B 27/143 82/1.11 |
| 2015/0090081 A1 | | 4/2015 | Onodera | |
| 2016/0243624 A1 | * | 8/2016 | Tomoda | B23B 27/143 |
| 2016/0339524 A1 | * | 11/2016 | Yamaguchi | B23B 27/143 |
| 2017/0297116 A1 | * | 10/2017 | Sakai | B23B 27/145 |

FOREIGN PATENT DOCUMENTS

| | | |
|---|---|---|
| KR | 10-2001-0011938 A | 2/2001 |
| KR | 10-0312957 B1 | 11/2001 |
| KR | 10-2008-0094751 A | 10/2008 |
| KR | 10-2012-0003248 A | 1/2012 |
| RU | 2039634 C1 | 7/1995 |
| RU | 2417864 C1 | 5/2011 |
| WO | 94/25208 A1 | 11/1994 |
| WO | WO-2013146899 A1 * | 10/2013 ........... B23B 27/143 |
| WO | 2014/132944 A1 | 9/2014 |

OTHER PUBLICATIONS

Office Action dated Dec. 29, 2018 irom the Federal Service for Intellectual Property of Russia in counterpart Russian Patent Application No. 2018114923/02, 12 pages.

* cited by examiner (a) EXAMPLE (b) COMPARATIVE EXAMPLE

COMPARISON OF ABRASION OF LAND PORTION (a) EXAMPLE (b) COMPARATIVE EXAMPLE

COMPARISON OF CHIP SIZE

MACHINING DIRECTION (a) EXAMPLE

CUTTING DEPTH [mm]
1.5
1.0
0.5

CONVEYANCE [mm/rev]

(b) COMPARATIVE EXAMPLE

CUTTING DEPTH [mm]
1.5
1.0
0.5

CONVEYANCE [mm/rev]

COMPARISON OF SURFACE ROUGHNESS (a)

(b)

COMPARISON OF ABRASION OF DOT (a) EXAMPLE (b) COMPARATIVE EXAMPLE

CUTTING INSERT

TECHNICAL FIELD

The present disclosure relates to a cutting insert, and more particularly, to a cutting insert which may be used by being mounted on a tool holder.

BACKGROUND ART

In general, a cutting insert is fixed to a cutting tool, and the cutting tool is mounted on a machine tool and used to cut a workpiece.

A cutting insert in the related art has a polygonal shape, a corner cutting edge is formed at a vertex portion, a main cutting edge is formed at an edge where an upper surface and a lateral surface meet together, and a chip breaker is formed between the upper surface and the main cutting edge.

However, as illustrated in the attached FIG. 10B, in the case of the cutting insert in the related art, a cut chip c is discharged while grazing the chip breaker such that the chip c and the chip breaker come into contact with each other at two points (see p4 and p5).

Since the chip c and the chip breaker come into contact with each other at the two points (see p4 and p5), there is a problem in that a cutting load is high because cutting force is applied to the chip breaker in a state in which the cutting force is not reduced.

In addition, since the chip c and the chip breaker come into contact with each other at the two points (see p4 and p5), there is a problem in that the contact points may be unstable, and chip curls are not uniformly formed. If the chip curls are not uniform, the chips have different sizes, and particularly, a long chip having a long length may be formed. The long chip makes it difficult to discharge the chips.

Meanwhile, high heat is generated at the cutting insert during the cutting process. The cutting insert needs to be cooled because the high heat adversely affects a lifespan of the cutting insert. The cut chip may exchange heat while coming into contact with the chip breaker, and the discharge of the heated cut chip assists in cooling the cutting insert. However, in the case of the cutting insert in the related art, since the chip c and the chip breaker come into contact with each other at the two points (see p4 and p5), a cooling effect may not be great.

DOCUMENT OF RELATED ART

Patent Document

US Patent Application Publication No. US2015/0090081 (Apr. 2, 2015)

DISCLOSURE

Technical Problem

Therefore, a technical problem to be solved by the present disclosure is to provide a cutting insert capable of reducing a cutting load, which is applied to the cutting insert by a cut chip, when the cut chip is formed and discharged as a cutting process is performed by the cutting insert, and improving a cooling effect.

In addition, another object of the present disclosure is to provide a cutting insert capable of more effectively machining forged steel for a vehicle component.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

To solve the aforementioned technical problems, a cutting insert according to an exemplary embodiment of the present disclosure includes: main cutting edges 20 which are formed at edge portions of a polygonal shape in a top plan view in which an upper surface 11 is directly viewed; corner cutting edges 30 which are formed at vertex portions of the polygonal shape so as to extend from the main cutting edges 20; chip breakers 70 which are formed between the upper surface 11 and the main cutting edges 20 and break a chip; main bottom portions 72 which are concavely formed between the main cutting edges 20 and the chip breakers 70; first dots 40 which are convexly formed on the chip breakers 70; and first bridges 42 which are formed between the main cutting edges 20 and the first dots 40 so as to be lower than the main cutting edges 20 and the first dots 40.

In addition, the cutting insert according to the exemplary embodiment of the present disclosure may further include: second dots 50 which are convexly formed on the chip breakers 70 so as to be spaced apart from the first dots 40; and second bridges 52 which are formed between the main cutting edges 20 and the second dots 50 so as to be lower than the main cutting edges 20 and the second dots 50.

In addition, according to the cutting insert according to the exemplary embodiment of the present disclosure, a first highest point T1 of the first dot 40 may be lower than the main cutting edge 20.

In addition, according to the cutting insert according to the exemplary embodiment of the present disclosure, a second highest point T2 of the second dot 50 may be lower than the main cutting edge 20.

In addition, according to the cutting insert according to the exemplary embodiment of the present disclosure, when a first highest point T1 of the first dot 40 and a second highest point T2 of the second dot 50 are connected by an imaginary line, a first angle a1 may be formed between the imaginary line and the main cutting edge 20, and the first angle a1 may be an acute angle.

In addition, according to the cutting insert according to the exemplary embodiment of the present disclosure, the first angle a1 may be 5 degrees to 10 degrees.

In addition, according to the cutting insert according to the exemplary embodiment of the present disclosure, a distance from a vertex of the corner cutting edge 30 to a first highest point T1 of the first dot 40 may be 0.5 mm to 2.0 mm.

In addition, according to the cutting insert according to the exemplary embodiment of the present disclosure, a distance from a vertex of the corner cutting edge 30 to a second highest point T2 of the second dot 50 may be 1.0 mm to 3.5 mm.

In addition, according to the cutting insert according to the exemplary embodiment of the present disclosure, a separation distance between the first dot 40 and the second dot 50 may be 0.5 mm to 2.5 mm.

In addition, according to the cutting insert according to the exemplary embodiment of the present disclosure, a main cutting edge land portion 22 may be formed on the main cutting edge 20, a corner land portion 32 may be formed on the corner cutting edge 30, and a width w1 of the corner land portion 32 may be smaller than a width w2 of the main cutting edge land portion 22.

In addition, according to the cutting insert according to the exemplary embodiment of the present disclosure, a longitudinal direction of the first dot 40 may form a second angle a2 with respect to the main cutting edge 20, and the second angle a2 may be an acute angle.

In addition, according to the cutting insert according to the exemplary embodiment of the present disclosure, the second angle a2 may be equal to or larger than 85 degrees and smaller than 90 degrees.

In addition, according to the cutting insert according to the exemplary embodiment of the present disclosure, a longitudinal direction of the second dot 50 may form a third angle a3 with respect to the main cutting edge 20, and the third angle a3 may be an acute angle.

In addition, according to the cutting insert according to the exemplary embodiment of the present disclosure, the third angle a3 may be equal to or larger than 85 degrees and smaller than 90 degrees.

In addition, according to the cutting insert according to the exemplary embodiment of the present disclosure, when a chip is produced and discharged, the chip and the cutting insert may come into contact with each other sequentially at a first point p1 at an end of the cutting edge land portion 22, a second point p2 on the first bridge 42, and a third point p3 on the first dot 40.

In addition, the cutting insert according to the exemplary embodiment of the present disclosure may further include corner bottom portions 34 which are concavely formed between the corner cutting edges 30 and the chip breakers 70, in which when a chip is produced and discharged, the chip and the cutting insert come into contact with each other sequentially at a first point at an end of the corner land portion 32, a second point on the corner bottom portion 34, and a third point on the chip breaker 70.

In addition, according to the cutting insert according to the exemplary embodiment of the present disclosure, a workpiece may be forged steel for a vehicle component.

Other detailed matters of the exemplary embodiment are included in the detailed description and the drawings.

Advantageous Effects

According to the cutting insert according to the exemplary embodiment of the present disclosure which is configured as described above, a chip, which is produced during a cutting process, comes into contact with the chip breaker at three points, and as a result, it is possible to reduce a cutting load and improve a lifespan of the cutting insert.

In addition, according to the cutting insert according to the exemplary embodiment of the present disclosure, a chip, which is produced during a cutting process, comes into contact with the chip breaker at three points, and as a result, it is possible to expect an increase in effect of cooling the cutting insert because a larger amount of heat is transferred from the cutting insert to the chip.

In addition, when chips are produced by the cutting insert according to the exemplary embodiment of the present disclosure, the chips may form uniform curls and have uniform sizes. Therefore, the chips are advantageously discharged.

DESCRIPTION OF MAIN REFERENCE NUMERALS OF DRAWINGS

Figure 1:
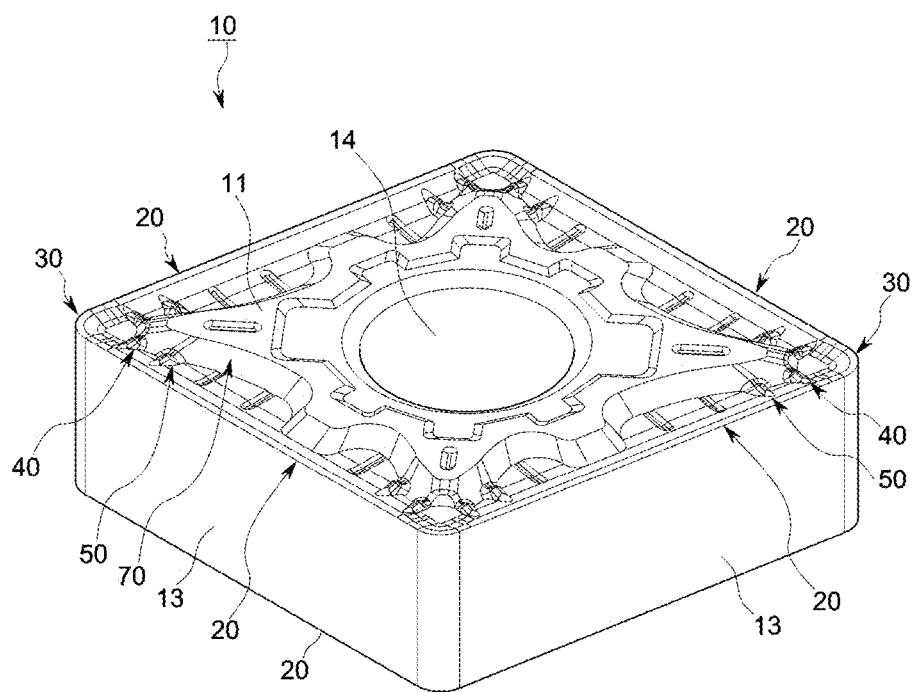
FIGS. 1 and 2 are a perspective view and a detailed view for explaining a cutting insert according to an exemplary embodiment of the present disclosure.

10: Cutting insert
11: Upper surface
12: Lower surface
13: Lateral surface
14: Fastening hole
20, 60: Main cutting edge
22, 62: Main cutting edge land portion
30: Corner cutting edge
32: Corner land portion
34: Corner bottom portion
40, 50: First and second dots
42, 52: First and second bridges
70: Main chip breaker
72: Main bottom portion
T1, T2: First and second highest points
W1: Width of corner land portion
w2: Width of main cutting edge land portion
a1, a2, a3, a4, a5: First to fifth angles
h1, h2, h3, h4: First to fourth heights
s1: Distance from corner to highest point of first dot
s2: Distance from corner to highest point of second dot
ap: Cutting depth
p1~p3: Contact point
w: Workpiece
c: Chip

BEST MODE

Advantages and features of the present disclosure and methods of achieving the advantages and features will be clear with reference to exemplary embodiments described in detail below together with the accompanying drawings.

Hereinafter, exemplary embodiments of the present disclosure will be described in detail with reference to the accompanying drawings. The exemplary embodiments to be described below are illustrative for helping understand the present disclosure, and it should be understood that the present disclosure may be implemented in various different ways from the exemplary embodiments described herein. However, in the description of the present disclosure, the specific descriptions and illustrations of publicly known functions or constituent elements will be omitted when it is determined that the specific descriptions may unnecessarily obscure the subject matter of the present disclosure. In addition, to help understand the present disclosure, the accompanying drawings are not illustrated based on actual scales, but parts of the constituent elements may be exaggerated in size.

Meanwhile, the terms such as "first" and "second" may be used to describe various constituent elements, but the constituent elements should not be limited by the terms. These terms are used only to distinguish one constituent element from another constituent element. For example, a first component may be named a second component, and similarly, the second component may also be named the first component, without departing from the scope of the present disclosure.

Meanwhile, the terms used in the description are defined considering the functions of the present disclosure and may vary depending on the intention or usual practice of a manufacturer. Therefore, the definitions should be made based on the entire contents of the present specification.

Like reference numerals indicate like constituent elements throughout the specification.

First Exemplary Embodiment

Figure 2:
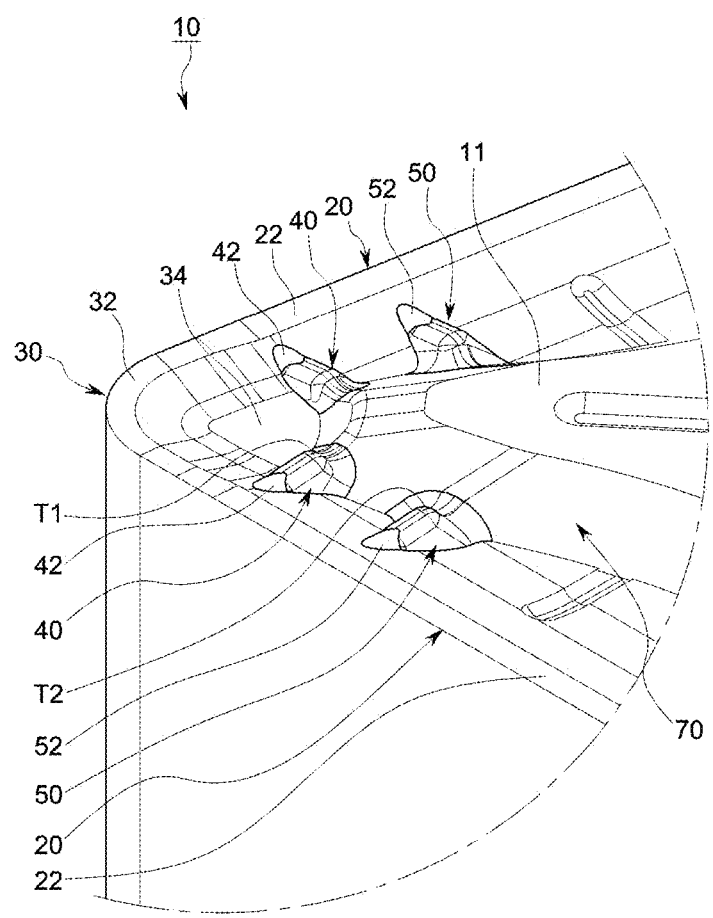
Figure 3:
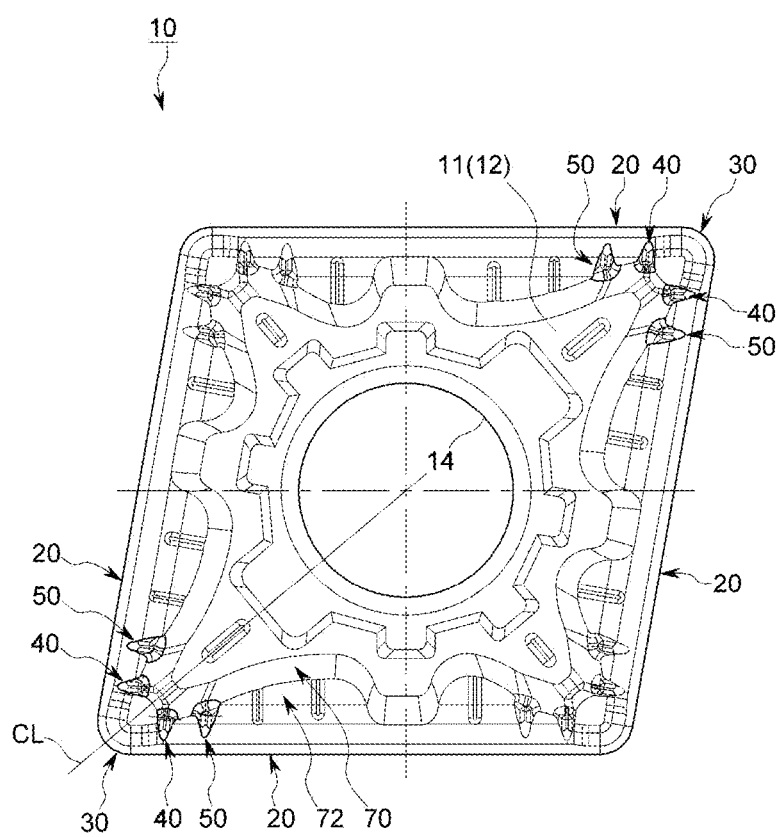
FIGS. 3 and 4 are a top plan view and a detailed view for explaining an example of the cutting insert according to the exemplary embodiment of the present disclosure.
Figure 4:
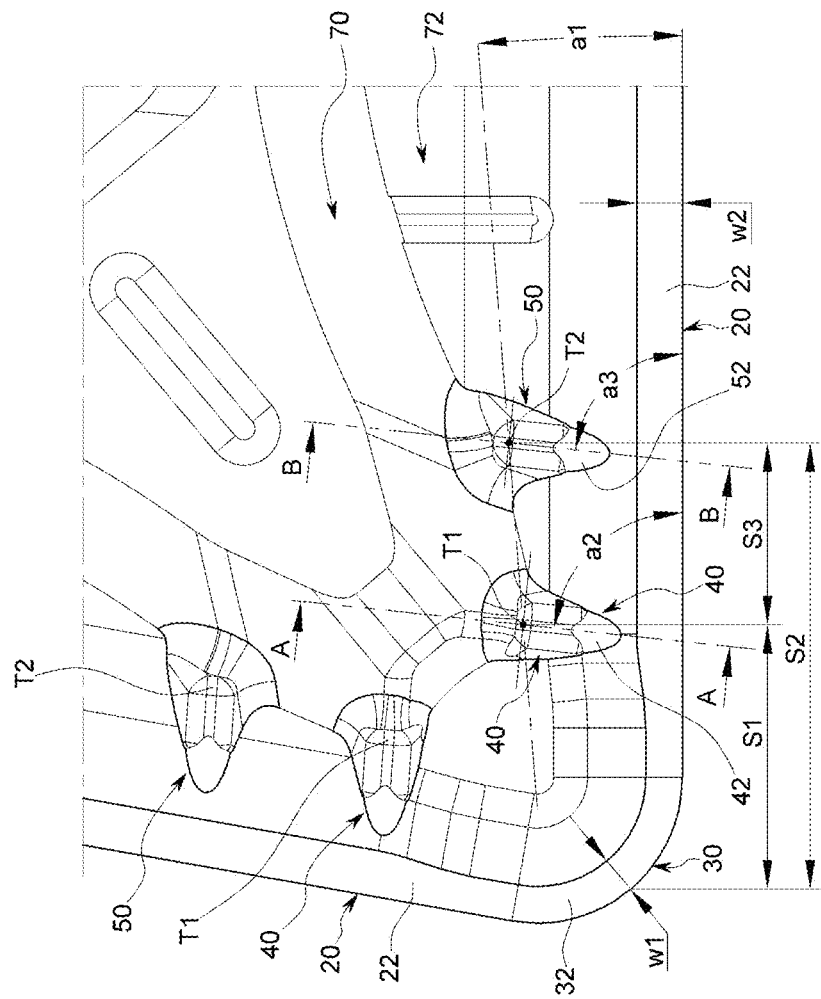
Figure 5:
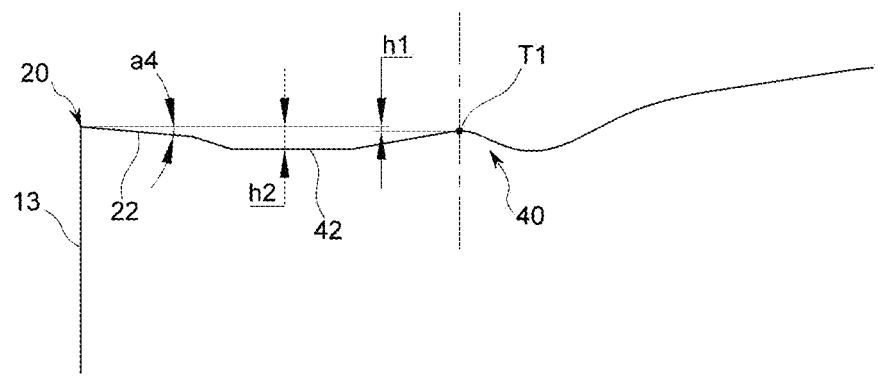
FIG. 5 is a cross-sectional view taken along line A-A of FIG. 4.
Figure 6:
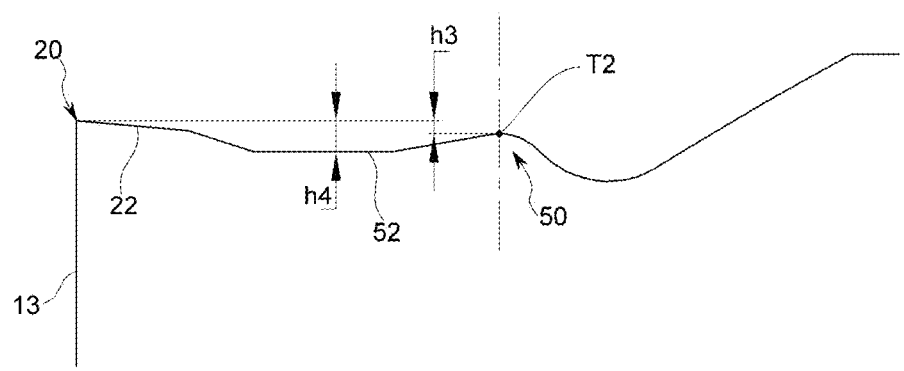
FIG. 6 is a cross-sectional view taken along line B-B of FIG. 4.

Hereinafter, a cutting insert according to an exemplary embodiment of the present disclosure will be described with reference to FIGS. 1 to 6. The attached FIGS. 1 and 2 are a perspective view and a detailed view for explaining the cutting insert according to the exemplary embodiment of the present disclosure. FIGS. 3 and 4 are a top plan view and a detailed view for explaining an example of the cutting insert according to the exemplary embodiment of the present disclosure. FIG. 5 is a cross-sectional view taken along line A-A of FIG. 4. FIG. 6 is a cross-sectional view taken along line B-B of FIG. 4.

A cutting insert 10 according to an exemplary embodiment of the present disclosure has a polygonal shape. In more detail, the cutting insert 10 has a polygonal shape when viewed in a top plan view based on a plane defined by an upper surface 11. Further, the cutting insert 10 has the upper surface 11 and lateral surfaces 13 that define a thickness (height), and a lower surface 12 is formed opposite to the upper surface 11. In addition, a fastening hole 14 is formed to penetrate the upper surface 11 and the lower surface 12, and the fastening hole 14 is used to fasten the cutting insert 10 to a cutting tool.

The cutting insert 10 has main cutting edges 20 formed at edge portions of the polygonal shape in the top plan view based on the plane defined by the upper surface 11.

In addition, the cutting insert 10 has corner cutting edges 30 formed at vertex portions of the polygonal shape, and the corner cutting edge 30 extends from the main cutting edge 20.

In addition, the cutting insert 10 has chip breakers 70 and main bottom portions 72 formed between the upper surface 11 and the main cutting edges 20. The main bottom portion 72 is concavely formed, and the chip breaker 70 is formed to be inclined. Further, the chip breaker 70 serves to break a cut chip.

In addition, the cutting insert 10 according to the exemplary embodiment of the present disclosure has first dots 40 convexly formed on the chip breaker 70. The first dot 40 comes into contact with a chip c when the chip is discharged, such that the chip is hardened to form a curl.

The first dot 40 comes into contact with the chip c when the chip is discharged, such that the chip is hardened to more effectively form a curl, and as a result, a size of the chip may be decreased.

In addition, the cutting insert 10 according to the exemplary embodiment of the present disclosure has first bridges 42 formed between the main cutting edges 20 and the first dots 40. As illustrated in FIG. 5, a first highest point T1 of the first dot 40 is lower than the main cutting edge 20 (see h1). Therefore, the chip c may smoothly come into contact with the first dot 40 even though a cutting depth ap is small, more particularly, even though the cutting depth ap is smaller than 4.5 mm In contrast, the patent document of related art does not disclose a technical spirit related to a height of a protrusion, and thus it is difficult to discharge the chip c.

Meanwhile, as illustrated in FIG. 5, the first bridge 42 is formed to be lower than the main cutting edge 20 and the first dot 40 (see h2).

In particular, the chip comes into contact with the first bridge 42, such that the points at which the chip comes into contact with the cutting insert 10 are positioned on a main cutting edge land portion 22, the first bridge 42, and the first dot 40.

Figure 10:
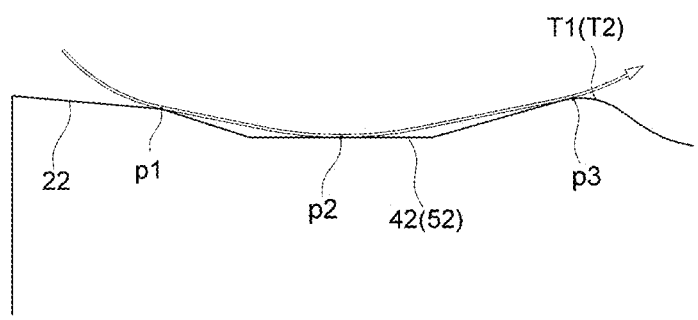
FIG. 10 is a view for explaining an operation of a dot of the cutting insert according to the exemplary embodiment of the present disclosure.
Figure 10:
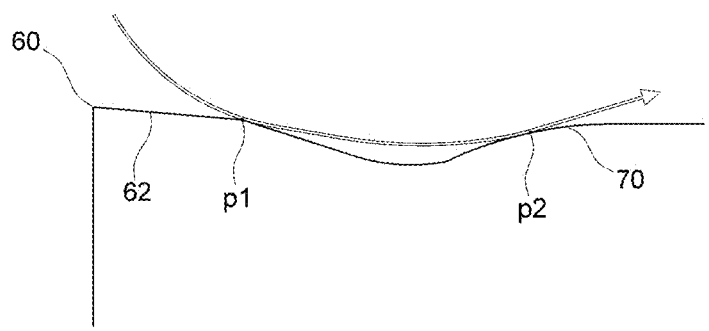

As illustrated in FIG. 10A, the cutting insert 10 according to the exemplary embodiment of the present disclosure comes into contact with the chip c at three points. Based on the first dot 40, the three points include a first point p1 at an end of the cutting edge land portion 22, a second point p2 on the first bridge 42, and a third point p3 which is the first highest point T1.

In contrast, if the bridge is not provided like the related art, the contact is made at two points as illustrated in FIG. 10B. The two points include a fourth point p4 which is formed at a part of a main cutting edge land portion 62 formed at one side of a main cutting edge 60, and a fifth point p5 which is formed at a part of the chip breaker 70.

Therefore, heat, which is generated during the cutting process, may be more actively transferred to the chip, thereby contributing to reducing a degree to which the cutting insert is heated. Moreover, expected lifespans of the cutting insert 10 and the cutting tool may be increased by reducing a degree to which the cutting insert is heated. In addition, the chips c discharge 70% or more of heat generated during the cutting process. Further, cutting oil may be introduced into a recess of the chip breaker 70, and the chip may come into direct contact with the cutting oil, such that a temperature of the chip may be directly decreased.

Meanwhile, as illustrated in FIG. 3, the cutting insert 10 according to the exemplary embodiment of the present disclosure may be formed to be symmetric based on a centerline CL that transverses a center of the fastening hole 14 and the corner cutting edges 30.

In addition, as illustrated in FIG. 3, the cutting insert 10 according to the exemplary embodiment of the present disclosure may be formed to be rotationally symmetric based on the center of the fastening hole 14.

Therefore, the multiple main cutting edges 20 and the multiple corner cutting edges 30 of the cutting insert 10 according to the exemplary embodiment of the present disclosure may be used in accordance with a direction in which the cutting insert 10 is fastened. FIG. 3 illustrates the cutting insert 10 having a rhombic shape, and in this case, the number of main cutting edges 20 is four. In addition, the two corner cutting edges 30 may be used, but because half of the corner cutting edges 30 are universally used and contributes to the cutting process when the cutting process is performed, the four corner cutting edges 30 may be used.

On the other hand, the cutting insert 10 according to the exemplary embodiment of the present disclosure may be configured to be rotationally symmetric based on the lateral surface 13. That is, the main cutting edges and the corner cutting edges, which are identical to those formed on the upper surface 11, may also be formed on the lower surface 12.

As a result, in the case of the cutting insert 10 according to the exemplary embodiment of the present disclosure, a maximum of eight main cutting edges and a maximum of eight corner cutting edges may be used if all of the main cutting edges formed on the upper surface 11 and all of the main cutting edges formed on the lower surface 12 are used.

Second Exemplary Embodiment

A cutting insert 10 according to a second exemplary embodiment of the present disclosure may further include second dots 50 in addition to the components of the cutting insert 10 according to the first exemplary embodiment.

The second dot 50 is convexly formed on the chip breaker 70 so as to be spaced apart from the first dot 40.

Further, the cutting insert 10 has second bridges 52 formed between the main cutting edges 20 and the second dots 50. As illustrated in FIG. 6, the second bridge 52 is formed to be lower than the main cutting edge 20 and the second dot 50 (see h4).

The cutting insert 10 according to the second exemplary embodiment of the present disclosure has the second dot 50 provided to be spaced apart from the first dot 40, and as a result, the chip comes into contact with the second dot 50 when the cutting depth ap is large (e.g., the cutting depth ap is equal to or larger than 3.0 mm), thereby smoothly forming a chip curl.

As illustrated in FIG. 10A, the cutting insert 10 according to the exemplary embodiment of the present disclosure comes into contact with the chip c at three points. Based on the second dot 50, the three points include a first point p1 at an end of the cutting edge land portion 22, a second point p2 on the second bridge 42, and a third point p3 which is a second highest point T2.

That is, since the cutting insert 10 according to the second exemplary embodiment of the present disclosure has the second bridge 52, the chip c and the second bridge 52 may come into contact with each other when the chip is discharged. The number of contact points between the chip c and the cutting insert 10 is increased, and as a result, it is possible to expect an effect of reducing a cutting load applied to the cutting insert 10 and improve a cooling effect.

In contrast, if the bridge is not provided like the related art, the contact is made at two points as illustrated in FIG. 10B. The two points include the fourth point p4 which is formed at a part of the main cutting edge land portion 62 formed at one side of the main cutting edge 60, and the fifth point p5 which is formed at a part of the chip breaker 70.

Meanwhile, the chips c discharge 70% or more of heat generated during the cutting process. Further, cutting oil may be introduced into the recess of the chip breaker 70, thereby directly decreasing a temperature of the chip.

On the other hand, work hardening occurs at the periphery of the portion where the chip c and the second dot 50 come into contact with each other, such that bending stress is increased as the chip c is rotated, and as a result, the chip c is cut. As a result, the second dot 50 may contribute to more assuredly inhibiting the chip from being formed to have a long length.

On the other hand, in the case of the cutting insert 10 according to the exemplary embodiment of the present disclosure, when the chip is produced and discharged, the chip and the cutting insert may come into contact with each other sequentially at the first point at the end of the corner land portion 32, the second point on the corner bottom portion 34, and the third point on the chip breaker 70. That is, since the chip and the cutting insert come into contact with each other at the three points, it is possible to reduce a cutting load.

Third Exemplary Embodiment

A cutting insert 10 according to a third exemplary embodiment of the present disclosure is configured such that the first highest point T1 of the first dot 40 of the cutting insert 10 according to the first and second exemplary embodiments is formed to be lower than the main cutting edge 20. Therefore, resistance may be reduced when the chip is discharged, and as a result, the chip may be quickly discharged.

Figure 15:
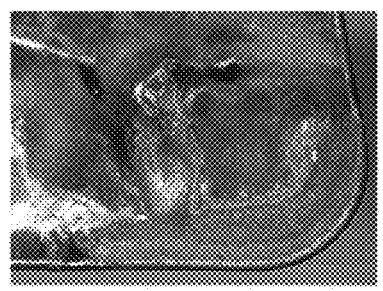
FIG. 15 is a view for explaining a lifespan of the dot of the cutting insert according to the exemplary embodiment of the present disclosure.
Figure 15:
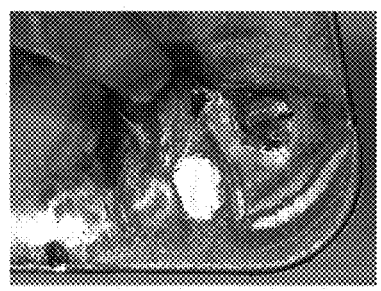

FIG. 15A is a view illustrating an Example, and abrasion of the first dot 40 is reduced when a height of the first dot 40 is lower than a height of the main cutting edge 20.

FIG. 15B illustrates a Comparative Example, and there is a problem in that a portion of the highest point of the dot is severely abraded if a height of the dot is higher than a height of the main cutting edge.

Therefore, in the case of the cutting insert 10 according to the third exemplary embodiment of the present disclosure, a height of the first dot 40 is lower than a height of the main cutting edge 20, and as a result, it is possible to improve a lifespan of the cutting insert.

Fourth Exemplary Embodiment

A cutting insert 10 according to a fourth exemplary embodiment of the present disclosure is configured such that the second highest point T2 of the second dot 50 of the cutting insert 10 according to the first and second exemplary embodiments is formed to be lower than the main cutting edge 20. Therefore, resistance may be reduced when the chip is discharged, and as a result, the chip may be quickly discharged.

In addition, similar to the third exemplary embodiment, in the fourth exemplary embodiment, abrasion of the second dot 50 is reduced when a height of the second dot 50 is lower than a height of the main cutting edge 20.

Therefore, in the case of the cutting insert 10 according to the fourth exemplary embodiment of the present disclosure, a height of the second dot 50 is lower than a height of the main cutting edge 20, and as a result, it is possible to contribute to improving a lifespan of the cutting insert.

Fifth Exemplary Embodiment

A cutting insert 10 according to a fifth exemplary embodiment of the present disclosure is configured such that when the first highest point T1 of the first dot 40 and the second highest point T2 of the second dot 50 are connected to each other by an imaginary line, a first angle a1 is formed between the imaginary line and the main cutting edge 20, and the first angle a1 is an acute angle as illustrated in FIG. 4.

An operation of the cutting insert 10 according to the fifth exemplary embodiment of the present disclosure will be described with reference to FIGS. 7 to 9. The attached FIGS. 7 to 9 are views for explaining a cutting operation of the cutting insert according to the exemplary embodiment of the present disclosure.

The first dot 40 precedes and the second dot 50 follows the first dot 40 based on a machining direction when the cutting process is performed. Therefore, when the chip c is discharged, the chip c collides with the first dot 40, and then collides with the second dot 50 with a time difference. As described above, since the chip collides with the first dot 40 and the second dot 50 with a time difference, it is possible to prevent an increase in abrasion of and load applied to the chip breaker 70.

If the chip c simultaneously comes into contact with the first dot 40 and the second dot 50, there is concern that abrasion of and a load applied to the chip breaker 70 will be increased.

Figure 7:
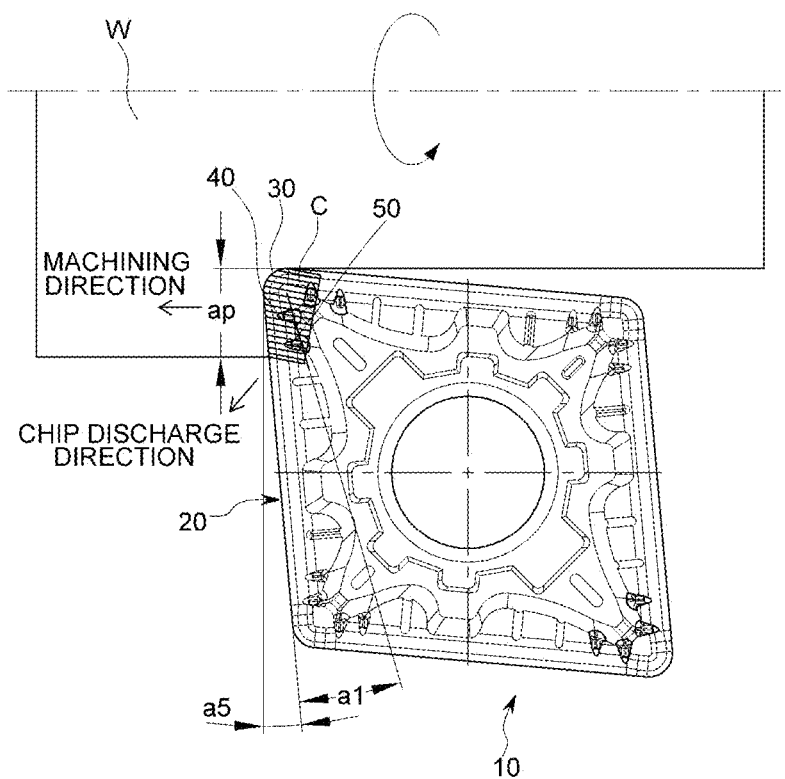
FIGS. 7 to 9 are views for explaining a cutting operation of the cutting insert according to the exemplary embodiment of the present disclosure.
Figure 8:
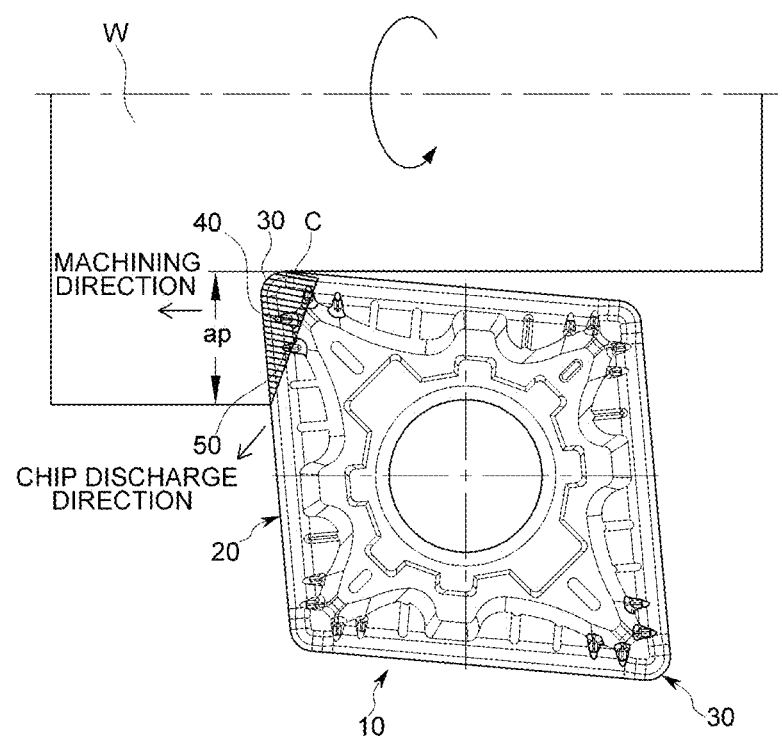
Figure 9:
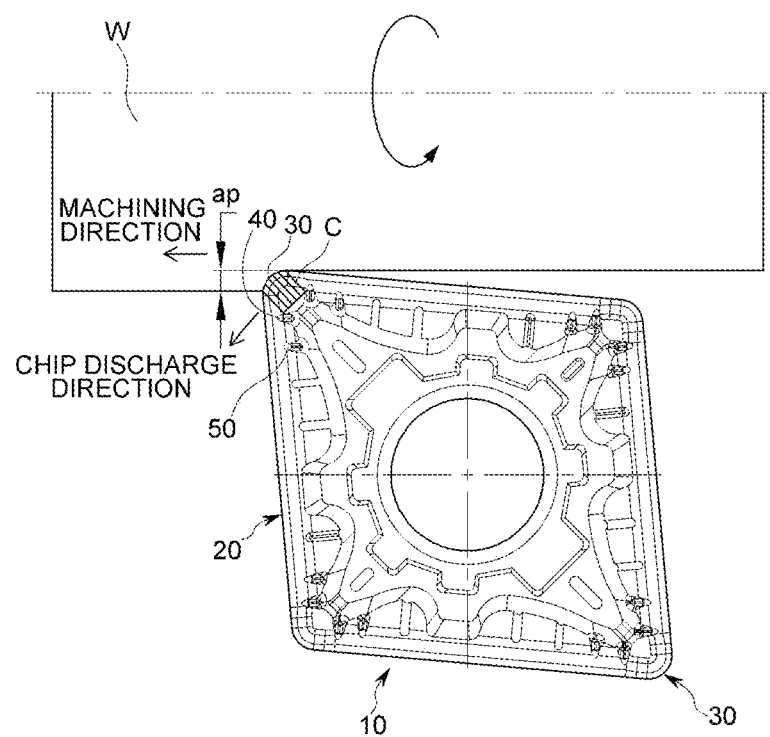

Meanwhile, as illustrated in FIGS. 7 to 9, the main cutting edge 20 may be installed to have a fifth angle a5 with respect to the machining direction when the cutting insert 10 is installed on the cutting tool. Therefore, the chip c may more assuredly and sequentially come into contact with the first dot 40 and the second dot 50.

Sixth Exemplary Embodiment

A cutting insert 10 according to a sixth exemplary embodiment of the present disclosure is configured such that the first angle a1 of the cutting insert 10 according to the fifth exemplary embodiment is 5 degrees to 10 degrees.

If the first angle a1 is larger than 5 degrees, the chip may sequentially come into contact with the first dot 40 and the second dot 50 when the chip is discharged, and as a result, it is possible to inhibit a load applied to the chip breaker 70 from being excessively increased.

In addition, if the first angle a1 is smaller than 10 degrees, it is possible to prevent a size of a configuration of the chip breaker 70 of the cutting insert 10 from being excessively increased.

Therefore, the first angle a1, which is formed between the main cutting edge 20 and the imaginary line that connects the first dot 40 and the second dot 50, may be 5 degrees to 10 degrees.

Seventh Exemplary Embodiment

In the case of a cutting insert 10 according to a seventh exemplary embodiment of the present disclosure, a distance S1 from a vertex of the corner cutting edge 30 to the first highest point T1 of the first dot 40 may be 0.5 mm to 2.0 mm Further, in the case of the cutting insert 10 according to the seventh exemplary embodiment of the present disclosure, a workpiece may be forged steel for a vehicle component, and a cutting depth of the workpiece may be 0.5 mm to 3.0 mm A chip curl may be smoothly formed as the first dot 40 and the chip c come into contact with each other in the state in which the distance S1 from the vertex of the corner cutting edge 30 to the first highest point T1 of the first dot 40 is in a range from 0.5 mm to 2.0 mm If the distance S1 from the vertex of the corner cutting edge 30 to the first highest point T1 of the first dot 40 is set to be smaller than 0.5 mm, a width from the vertex to the first dot 40, in more detail, a corner bottom portion 34 may be formed to be too narrow. In this case, an effect of reducing a cutting load may deteriorate. That is, in FIG. 5A, the chip may not come into contact with the second point p2, and as a result, the chip may not be smoothly processed.

Meanwhile, if the distance S1 from the vertex of the corner cutting edge 30 to the first highest point T1 of the first dot 40 is larger than 2.0 mm, versatility may deteriorate even though the dot may operate.

The versatility will be further described. A cutting depth of a forged product is mainly 3.0 mm or less, and the cutting depth needs to allow a finish grinding process of 0.5 mm. That is, the forged steel for a vehicle component needs to be machined and a general finish grinding process needs to be performed in order to obtain the versatility.

Therefore, if the distance S1 from the vertex of the corner cutting edge 30 to the first highest point T1 of the first dot 40 is larger than 2.0 mm, a finishing process may not be performed, and as a result, the cutting insert may not be applied to machine the forged steel for a vehicle component.

However, in the case of the cutting insert according to the exemplary embodiment of the present disclosure, the distance S1 from the vertex of the corner cutting edge 30 to the first highest point T1 of the first dot 40 is 0.5 mm to 2.0 mm, and as a result, it is possible to smoothly cut the forged steel for a vehicle component in which the cutting depth of the workpiece is 0.5 mm to 3.0 mm Eighth Exemplary Embodiment In the case of a cutting insert 10 according to an eighth exemplary embodiment of the present disclosure, a distance from the vertex of the corner cutting edge 30 to the second highest point T2 of the second dot 50 may be 1.0 mm to 3.5 mm A chip curl may be smoothly formed as the second dot 50 and the chip c come into contact with each other in the state in which the distance S2 from the vertex of the corner cutting edge 30 to the second highest point T2 of the second dot 50 is in a range from 1.0 mm to 3.5 mm Ninth Exemplary Embodiment A cutting insert 10 according to a ninth exemplary embodiment of the present disclosure is configured such that a separation distance between the first dot 40 and the second dot 50 may be 0.5 mm to 2.5 mm.

If the separation distance between the first dot 40 and the second dot 50 is equal to or larger than 0.5 mm, the chip c may clearly and sequentially come into contact with the first dot 40 and the second dot 50, and as a result, it is possible to inhibit an increase in abrasion of and load applied to the breaker.

In addition, if the separation distance between the first dot 40 and the second dot 50 is equal to or smaller than 2.5 mm, it is possible to prevent a size of the configuration of the chip breaker 70 from being excessively increased.

Tenth Exemplary Embodiment

A cutting insert 10 according to a tenth exemplary embodiment of the present disclosure is configured such that the main cutting edge land portion 62 is formed on the main cutting edge 20, and the corner land portion 32 is formed on the corner cutting edge 30. A width w1 of the corner land portion 32 may be smaller than a width w2 of the main cutting edge 62.

In general, as illustrated in FIG. 9, under a cutting condition in which the cutting depth ap is small, cutting resistance is relatively small, such that the chip cannot enter the bottom portion of the chip breaker 70. However, in the case of the cutting insert 10 according to the tenth exemplary embodiment of the present disclosure, since the corner land portion 32 of the corner cutting edge 30 is narrow, the chip smoothly enters the main bottom portion 72 of the chip breaker 70, such that rough machining may be easily performed.

Meanwhile, if the cutting depth ap is large, relatively large upper abrasion (crater wear) occurs on the land portion. In particular, during machining with high-speed conveyance, the upper abrasion reaches an auxiliary cutting edge, such that chips are produced from the auxiliary cutting edge that determines a dimension, and as a result, the workpiece may be damaged.

Therefore, in the case of the cutting insert 10 according to the tenth exemplary embodiment of the present disclosure, it is possible to prevent the abrasion shape from reaching the corner cutting edge 30 and improve a lifespan of the tool by changing the land, in more detail, by forming the cutting insert such that the width w1 of the corner land portion 32 is smaller than the width w2 of the main cutting edge land portion 22.

Figure 11:
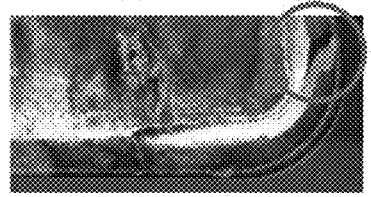
FIG. 11 is a view for explaining an operational effect of a land portion of the cutting insert according to the exemplary embodiment of the present disclosure.
Figure 11:
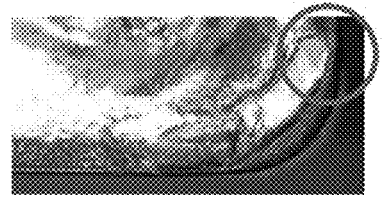
Figure 16:
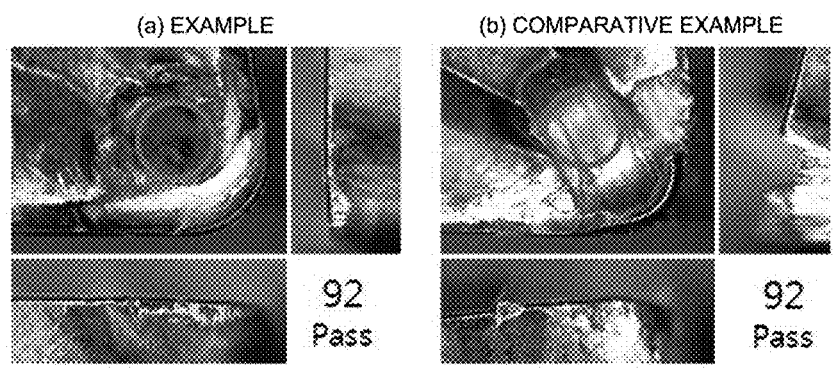
FIG. 16 is a view for explaining an operational effect of a cutting insert in an embodiment.

The attached FIGS. 11 and 16 are photographs, which are substituted for drawings, for explaining an operational effect of the cutting insert 10 according to the tenth exemplary embodiment of the present disclosure.

The cutting condition is equally set in Example (a) and Comparative Example (b), and the cutting insert shown in Comparative Example (b) has a land portion that has a constant width.

As illustrated in FIG. 11B, if the main cutting edge land portion of the main cutting edge and the corner land portion of the corner cutting edge have the same width, the main breaker 70 may be abraded and a flow of the chip may be unstable when the cutting insert is moved at a high speed. In addition, a load applied to the corner land portion of the corner cutting edge may be increased, and the portion, which defines the corner cutting edge, is severely abraded, such that a lifespan of the tool may be shortened.

In more detail, if the high-speed conveyance is performed when the cutting process is performed, an abrasion amount of the corner bottom portion 34 (see a part indicated by a circle) of Example (a) of the present disclosure is smaller than that of Comparative Example (b), as illustrated in FIG. 16A. Further, in Example (a) of the present disclosure, a flow of the chip is stable because the corner bottom portion 34 is less abraded. Therefore, as illustrated in FIG. 11A, the abrasion amount of the corner land portion (see the part indicated by the circle) is decreased.

In contrast, as illustrated in FIG. 16B, in the case of Comparative Example (b), the corner bottom portion 34 (see the part indicated by the circle) is severely abraded in comparison with Example (a) of the present disclosure, such that a flow of the chip may be unstable. In addition, a load applied to the corner land portion is increased if the flow of the chip is unstable. Therefore, as illustrated in FIG. 11B, the corner land portion (see the part indicated by the circle) may be severely abraded.

Therefore, as illustrated in FIG. 11A, when the width w1 of the corner land portion 32 is smaller than the width w2 of the main cutting edge land portion 22, the corner cutting edge 30 and the corner land portion 32 are abraded relatively less than the Comparative Example. That is, a lifespan of the cutting insert 10 according to the tenth exemplary embodiment of the present disclosure may be improved Hereinafter, an operational effect of the cutting insert 10 according to the first to tenth exemplary embodiments of the present disclosure will be described with reference to FIGS. 12 to 14.

Figure 12:
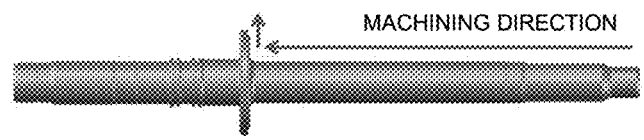
FIG. 12 is a view for explaining a size of a chip produced by the cutting insert according to the exemplary embodiment of the present disclosure.
Figure 12:
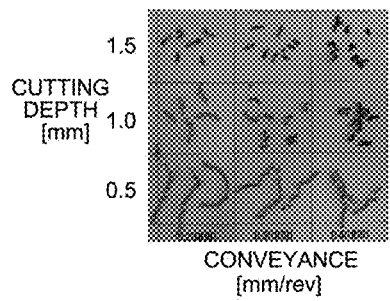
Figure 12:
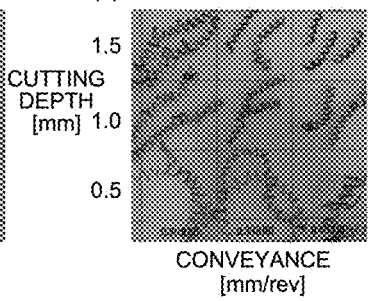

The attached FIG. 12 is a view for explaining a size of a chip produced by the cutting insert according to the exemplary embodiment of the present disclosure. In more detail, FIG. 12A illustrates a chip which is produced by performing the cutting process by using the cutting insert 10 according to the exemplary embodiment of the present disclosure. FIG. 12B illustrates a chip which is produced by performing the cutting process by using a cutting insert known in the related art.

Further, the cutting condition is equally set. That is, the condition related to a conveying speed and a cutting depth is equally set.

As a result of comparing a chip size, as illustrated in FIG. 12, it can be seen that a size of the chip c produced by the cutting insert 10 according to Example (a) of the present disclosure is much smaller than that of Comparative Example (b).

Therefore, the cutting insert 10 according to the exemplary embodiment of the present disclosure is advantageous in discharging the chips because the sizes of the chips are small and uniform.

Figure 13:
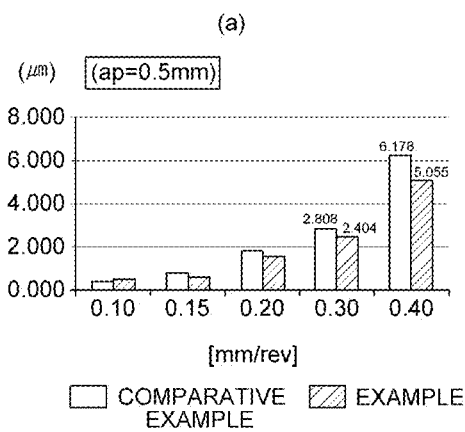
FIG. 13 is a view for explaining an effect of surface roughness of a surface machined by the cutting insert according to the exemplary embodiment of the present disclosure.
Figure 13:
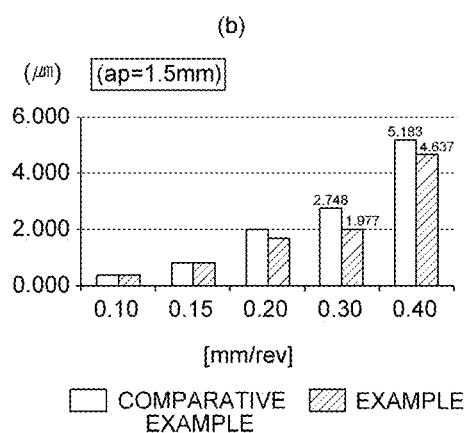

The attached FIG. 13 is a view for explaining an effect of surface roughness of a surface machined by the cutting insert according to the exemplary embodiment of the present disclosure.

FIG. 13A illustrates a case in which the cutting depth is set to be 0.5 mm, and the cutting depth is small. As a conveying speed is increased, the surface roughness is better in the Example of the present disclosure than the Comparative Example. In particular, when a conveying speed is 0.3 to 0.4 mm/rev, the surface roughness is much better in the Example of the present disclosure than the Comparative Example.

FIG. 13B illustrates a case in which the cutting depth is set to be 1.5 mm. Similar to FIG. 13A, as a conveying speed is increased, the surface roughness is better in the Example of the present disclosure than the Comparative Example. In particular, when a conveying speed is 0.3 to 0.4 mm/rev, the surface roughness is much better in the Example of the present disclosure than the Comparative Example.

Figure 14:
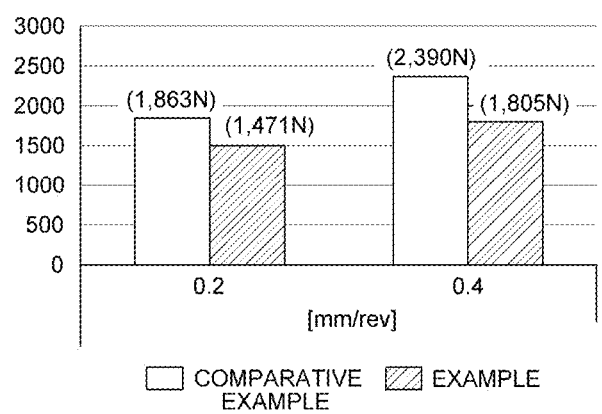
FIG. 14 is a view for explaining cutting force applied to the cutting insert according to the exemplary embodiment of the present disclosure.

The attached FIG. 14 is a view for explaining cutting force applied to the cutting insert according to the exemplary embodiment of the present disclosure.

As illustrated in FIG. 14, when the conveying speed is 0.2 mm/rev, the cutting force in the Comparative Example is 1863 N, and the cutting force in the Example of the present disclosure is 1471 N. That is, it can be seen that a cutting load is lower in the Example of the present disclosure than the Comparative Example.

In addition, when the conveying speed is 0.4 mm/rev, the cutting load in the Comparative Example is 2390 N, and the cutting load in the Example of the present disclosure is 1805 N. Likewise, it can be seen that the cutting load is lower in the Example of the present disclosure than the Comparative Example even though the conveying speed is increased.

Therefore, the cutting insert 10 according to the exemplary embodiment of the present disclosure has an effect of reducing a cutting load by the configurations of the first and second dots 40 and 50, the first and second bridges 42 and 52, the main cutting edge land portion 22, and the corner land portion 32.

Eleventh Exemplary Embodiment

As illustrated in FIG. 4, a cutting insert 10 according to an eleventh exemplary embodiment of the present disclosure is configured such that the first and second dots 40 and 50 may have second and third angles a2 and a3 with respect to the main cutting edge 20, and each of the second and third angles a2 and a3 may be an acute angle.

As illustrated in FIG. 7, when the cutting insert 10 is installed on the cutting tool, the main cutting edge 20 of the cutting insert 10 may be installed at the fifth angle a5 with respect to the machining direction.

Meanwhile, in the case of the cutting insert 10 according to the eleventh exemplary embodiment of the present disclosure, the first and second dots 40 and 50 have the second and third angles a2 and a3, such that a forward direction may be made with respect to a direction in which the chip is produced. Therefore, the first and second dots 40 and 50 may inhibit a cutting load from being increased when the chip is produced.

On the other hand, each of the second and third angles a2 and a3 may be equal to or larger than 85 degrees and smaller than 90 degrees.

If the second and third angles a2 and a3 are smaller than 85 degrees, the first and second dots 40 and 50 may be excessively crooked in a longitudinal direction, and in this case, a cutting load may be increased when the chip is produced.

Likewise, if the second and third angles a2 and a3 are equal to or larger than 90 degrees, the first and second dots 40 and 50 may be excessively crooked reversely in the longitudinal direction, and in this case, a cutting load may be increased when the chip is produced.

Therefore, the longitudinal direction of the first and second dots 40 and 50 may be coincident with or similar to a direction in which the chip is produced and grown, and as a result, resistance against the movement of the chip is reduced, such that the chip is more smoothly discharged.

While the exemplary embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned exemplary embodiment is described for illustration in all aspects and is not limited, and the scope of the present disclosure shall be represented by the claims to be described below, and it should be construed that all of the changes or modified forms induced from the meaning and the scope of the claims, and an equivalent concept thereto are included in the scope of the present disclosure.

INDUSTRIAL APPLICABILITY

The cutting insert according to the exemplary embodiment of the present disclosure may be used to perform a cutting process.

The invention claimed is:

1. A cutting insert comprising:
   main cutting edges 20 which are formed at edge portions of a polygonal shape in a top plan view in which an upper surface 11 is directly viewed;
   corner cutting edges 30 which are formed at vertex portions of the polygonal shape so as to extend from the main cutting edges 20;
   chip breakers 70 which are formed between the upper surface 11 and the main cutting edges 20 and break a chip;
   main bottom portions 72 which are concavely formed between the main cutting edges 20 and the chip breakers 70;
   first dots 40 which are convexly formed on the chip breakers 70;
   first bridges 42 which are formed between the main cutting edges 20 and the first dots 40 so as to be lower than the main cutting edges 20 and the first dots 40;
   second dots 50 which are convexly formed on the chip breakers 70 so as to be spaced apart from the first dots 40 with respect to a machining direction; and
   second bridges 52 which are formed between the main cutting edges 20 and the second dots 50 so as to be lower than the main cutting edges 20 and the second dots 50.

2. The cutting insert of claim 1, wherein a first highest point T1 of the first dot 40 is lower than the main cutting edge 20.

3. The cutting insert of claim 1, wherein a second highest point T2 of the second dot 50 is lower than the main cutting edge 20.

4. The cutting insert of claim 1, wherein when a first highest point T1 of the first dot 40 and a second highest point T2 of the second dot 50 are connected by an imaginary line, a first angle a1 is formed between the imaginary line and the main cutting edge 20, and the first angle a1 is an acute angle.

5. The cutting insert of claim 4, wherein the first angle a1 is 5 degrees to 10 degrees.

6. The cutting insert of claim 1, wherein a distance from a vertex of the corner cutting edge 30 to a first highest point T1 of the first dot 40 is 0.5 mm to 2.0 mm.

7. The cutting insert of claim 1, wherein a distance from a vertex of the corner cutting edge 30 to a second highest point T2 of the second dot 50 is 1.0 mm to 3.5 mm.

8. The cutting insert of claim 1, wherein a separation distance between the first dot 40 and the second dot 50 is 0.5 mm to 2.5 mm.

9. The cutting insert of claim 1, wherein a main cutting edge land portion 22 is formed on the main cutting edge 20, a corner land portion 32 is formed on the corner cutting edge 30, and a width w1 of the corner land portion 32 is smaller than a width w2 of the main cutting edge land portion 22.

10. The cutting insert of claim 9, further comprising:
    corner bottom portions 34 which are concavely formed between the corner cutting edges 30 and the chip breakers 70,
    wherein said cutting insert is adapted to contact a produced chip sequentially at a first point at an end of the corner land portion 32, a second point on the corner bottom portion 34, and a third point on the chip breaker 70.

11. The cutting insert of claim 1, wherein a longitudinal direction of the first dot 40 forms a second angle a2 with respect to the main cutting edge 20, and
    the second angle a2 is an acute angle.

12. The cutting insert of claim 11, wherein the second angle a2 is equal to or larger than 85 degrees and smaller than 90 degrees.

13. The cutting insert of claim 1, wherein a longitudinal direction of the second dot 50 forms a third angle a3 with respect to the main cutting edge 20, and the third angle a3 is an acute angle.

14. The cutting insert of claim 13, wherein the third angle a3 is equal to or larger than 85 degrees and smaller than 90 degrees.

15. The cutting insert of claim 1, which is adapted to contact a produced chip sequentially at a first point p1 at an end of the cutting edge land portion 22, a second point p2 on the first bridge 42, and a third point p3 on the first dot 40.

16. The cutting insert of claim 1, which is intended to machine a workpiece made of forged steel for a vehicle component.

* * * * *